United States Patent [19]

Peters

[11] Patent Number: 5,483,943
[45] Date of Patent: Jan. 16, 1996

[54] GASEOUS FUEL SUPPLY MODULE FOR AUTOMOTIVE INTERNAL COMBUSTION ENGINE

[75] Inventor: Edward W. Peters, Belleville, Mich.

[73] Assignee: Ford Motor Company, Dearborn, Mich.

[21] Appl. No.: 308,786

[22] Filed: Sep. 19, 1994

[51] Int. Cl.⁶ .......................... F02M 21/04; F02M 23/14
[52] U.S. Cl. ........................................ 123/527; 123/557
[58] Field of Search ................................. 123/527, 525, 123/27 GE, 557; 165/40

[56] References Cited

U.S. PATENT DOCUMENTS

| | | | |
|---|---|---|---|
| 3,378,063 | 4/1968 | Mefferd | 165/40 |
| 4,335,697 | 6/1982 | McLean | 123/527 |
| 4,351,284 | 9/1982 | Ludwig | 123/545 |
| 4,359,972 | 11/1982 | Calkins | 123/557 |
| 4,404,948 | 9/1983 | Feltrin | 123/546 |
| 4,503,832 | 3/1985 | Pefley et al. | 123/527 |
| 4,545,356 | 10/1985 | Casey | 123/527 |
| 4,688,537 | 8/1987 | Calkins et al. | 123/557 |
| 4,909,209 | 3/1990 | Takahasi | 123/527 |
| 5,010,868 | 4/1991 | Clements | 123/527 |
| 5,237,981 | 8/1993 | Polletta et al. | 123/527 |
| 5,375,582 | 12/1994 | Wimer | 123/525 |

*Primary Examiner*—Erick R. Solis
*Attorney, Agent, or Firm*—Jerome R. Drouillard; Roger L. May

[57] ABSTRACT

A fuel supply module for furnishing gaseous fuel to a liquid cooled internal combustion engine includes a pressure regulator for reducing gas pressure from a relatively higher tank pressure to a relatively lower pressure required for induction into an engine, and a heating chamber surrounding at least part of the pressure regulator. The flow of liquid coolant into the module is controlled by means of a temperature controller which senses the temperature of the coolant within the heating chamber and which controls the amount of coolant flowing through the heating chamber in response to the sensed temperature so as to control the amount of which is transferred to the gas flowing through the fuel supply module.

8 Claims, 1 Drawing Sheet

GASEOUS FUEL SUPPLY MODULE FOR AUTOMOTIVE INTERNAL COMBUSTION ENGINE

FIELD OF THE INVENTION

The present invention relates to a fuel supply module for furnishing gaseous fuel to a liquid cooled automotive internal combustion engine.

BACKGROUND OF THE INVENTION

Although natural gas has been used as a fuel for stationary internal combustion engines for some time, usage of compressed natural gas as a fuel for motor vehicles, on a mass production scale, is in its infancy. Stationary engines use natural gas from service lines, which provide gas at relatively low pressures. In contrast, natural gas is usually stored in vehicles in pressure vessels at approximately 3,000 PSI. Of course, gas cannot be injected into an engine at 3,000 PSI and must first be reduced in pressure. This pressure reduction is accomplished within a pressure regulator, which steps down 3,000 PSI tank pressure to approximately 100 PSI. This reduction in pressure is accompanied by a temperature drop of 100°–120° F. Unfortunately, this drastic temperature decrease may cause icing and consequent plugging of passages within the fuel system in the event that the fuel is contaminated with moisture. Moreover, extremely low temperatures may be harmful to hoses and other fuel system components. Accordingly, it is desirable to heat the pressure regulator to avoid this icing and concomitant blockage of the fuel passages.

U.S. Pat. No. 5,010,868 discloses a propane delivery system in which two regulators are provided with externally controlled electric heaters. These heaters are operated by a thermostat and an electric supply system. This of course requires the use of an electronic control system which, along with the heaters, uses power from the vehicle. Of course, electric heaters are prone to burn out, shorting, and other failure modes, and are not generally regarded to be a robust system for providing heat in an automotive environment. Although externally controlled, coolant heated systems for the purpose of providing heat to gas pressure regulators are known such systems are not able to accurately control the temperature of the gas, or indeed, the amount of heat transfered to the gas by the coolant.

A system according to the present invention overcomes the faults with known electric and coolant heaters in a compact fuel supply module requiring little more packaging space than a bare regulator, while providing gas having a low pressure and a controlled temperature for injection into the engine.

SUMMARY OF THE INVENTION

A fuel supply module for furnishing gaseous fuel to a liquid cooled internal combustion engine includes a pressure regulator for regulating gas pressure from a relatively higher tank pressure to a relatively lower pressure required for induction into an engine and a heating chamber or heating passage surrounding at least part of the pressure regulator. A means for conducting liquid engine coolant from an engine into the heating chamber or other heating passage and for returning the coolant to the engine assures that heat will be transferred from the coolant to gas flowing through the fuel supply module. Finally, a temperature control means senses the temperature of the coolant within the heating chamber and controls the amount of coolant flowing through the heating chamber in response to the sensed temperature such that the amount of heat which is transferred to the gas flowing through the fuel supply module is controlled. The temperature control means may comprise a thermally responsive valve mounted within the heating chamber such that as the temperature of the engine coolant flowing through the heating chamber increases the valve will begin to close and thereby restrict the flow of coolant through the heating chamber at the time a first predetermined temperature has been reached. The valve will close substantially as a second predetermined temperature is reached such that the temperature within the heating chamber will be maintained at or near the second predetermined temperature. In other words, the thermally responsive valve reaches an equilibrium point at which the temperature is maintained at a relatively steady state.

In a preferred embodiment, the pressure responsive valve comprises a sealed, generally cylindrical chamber having a pushrod extending axially therefrom, with the cylinder containing a thermally responsive material having a positive coefficient of thermal expansion, such that the pushrod will be moved axially from the cylinder when the coolant temperature within the heating chamber increases. As a result, the pushrod will contact an abutment and the reaction will urge the valve cylinder, which functions as a valve plunger, into contact with a valve seat associated with a passage for conducting coolant through the heating chamber. This will restrict the flow of coolant through the heating chamber and thereby cause the temperature within the chamber to be regulated.

DETAILED DESCRIPTION OF THE PREFERRED EMBODIMENT

It is an advantage of the present invention that the temperature of gaseous fuel entering an engine fueled with a fuel such as compressed natural gas may be maintained without the need of externally controlled electronic or coolant driven heaters. It is further an advantage of the present invention that additional energy is not required, as is the case with electrical powered heaters. A device and system according to the present invention may be used with not only natural gas fueled vehicles, but also with liquefied petroleum gas (LPG) fuel systems, in the event that heating of a fuel pressure regulator is required.

Figure 1:
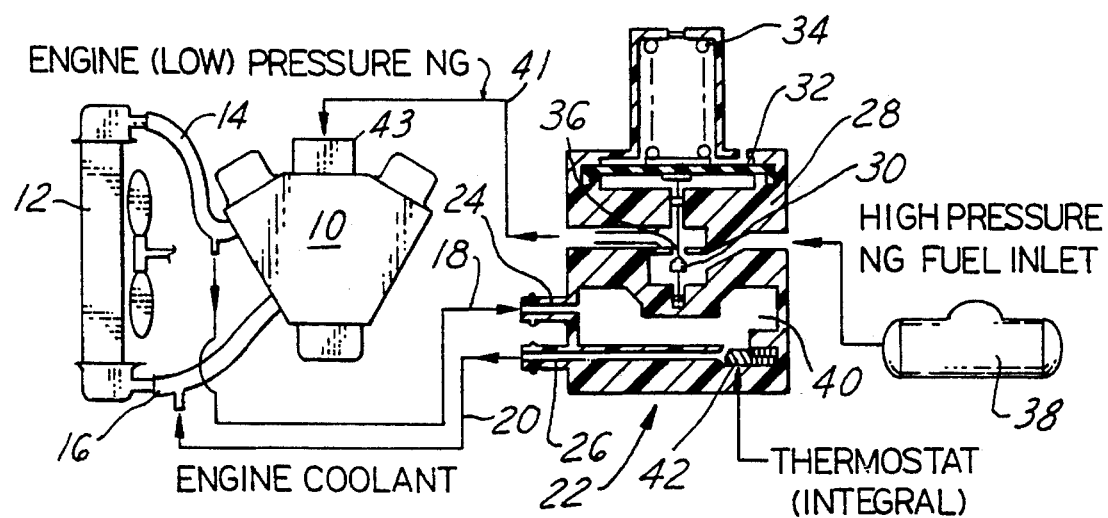
FIG. 1 is a schematic representation of an engine and gaseous fuel supply module according to the present invention.

As shown in FIG. 1, internal combustion engine 10 has an air-to-liquid radiator 12 through which liquid coolant passes via upper radiator hose 14 and lower radiator hose 16. Those skilled in the art will appreciate that radiator 12 may comprise either a conventional engine cooling radiator, or any other type of engine coolant heat exchanger, such as a heater core for heating the passenger compartment of a vehicle. The important point with respect to the present invention is that coolant is circulated from engine 10 to module 22 without first circulating through a heat exchanger. As a result, the coolant entering module 22 is at the greatest possible temperature.

Upper radiator hose 14 handles a relatively higher pressure, whereas hose 16 handles a relatively lower pressure. Coolant supply conduit 18, which extends between upper radiator hose 14 and inlet pipe 24 of fuel supply module 22, provides liquid coolant to heating chamber 40 of module 22. Heating chamber 40 surrounds a lower portion of valve body 31 within module 22, and heat from the liquid engine coolant flowing through heating chamber 40 is transferred to valve body 31, with heat flowing ultimately to the area around orifice 36. This heating assures that neither orifice 36, nor any of the downstream gas passages, become occluded with ice arising from moisture carried within the gaseous fuel. Of course, module 22 includes not only heating chamber 40 and associated valving, which will be described in greater detail below, but also a pressure regulator for reducing gas pressure from the relatively higher tank pressure—say a maximum of 3,000 PSI—from tank 38, to about 100-110 PSI for injection into the engine. Those skilled in the art will appreciate in view of this disclosure that a variety of regulator mechanisms could be used for the purpose of accomplishing this reduction in gas pressure. In the present case, popper 30, which is positioned by means of diaphragm 32, which is loaded by regulator spring 34, functions to control the flow through orifice 36 so as to accomplish the task of reducing the pressure in the flowing gas arising from tank 38. After the pressure of the gas is reduced in the pressure regulator, gas flows into the engine via supply line 41 and fuel injector 43, which are shown schematically in FIG. 1.

Figure 2:
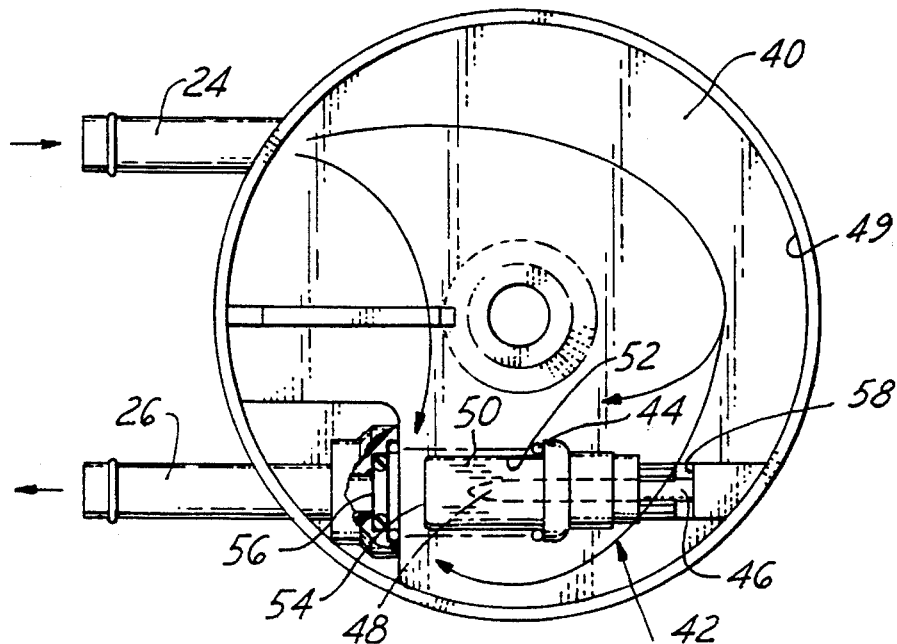
FIG. 2 is a cutaway view of the lower portion of a fuel supply module according to the present invention, showing the inventive temperature control means.

Further details of the present invention are shown with specificity in FIG. 2. Pipes 24 and 26 are shown as conducting liquid coolant into and out of heating chamber 40. The flow of liquid coolant from heating chamber 40 through pipe 26 is controlled by thermally responsive valve 42. This valve includes cylinder 52, which has pushrod 46 extending axially therefrom. Exterior end 54 of cylinder 52 functions as a valve plunger which is selectively seated upon valve seat 56. Valve seat 56 preferably comprises the 0-ring illustrated in FIG. 2; alternatively, seat 56 may be integrally formed with housing 49 of module 22. Pushrod 46 is positioned at its exterior end against abutment 58 such that as pushrod 46 is expelled from cylinder 52, exterior end 54 will be pushed against the force of spring 44 into a position in which the flow of coolant through chamber 40 becomes increasingly restricted.

Pushrod 46 has point 48 at its innermost end which along with the cylindrical shaft of the pushrod contacts wax mixture 50, which has a positive coefficient of thermal expansion. Pushrod 46 and wax mixture fill the entirety of the interior of cylinder 52. Thus as the temperature of the coolant flowing into chamber 40 increases, the wax absorb heat from the flowing coolant and will expand, causing pushrod 46 to be ejected or projected further from cylinder 52, thereby pushing exterior cylinder end 54 into contact with valve seat 56. Thereafter, once wax 50 within thermally responsive valve 42 contracts due to a lower temperature within heating chamber 40 caused by reduced coolant flow in the presence of continued heat transfer to the expanding gas going through the pressure regulator section of the present module, spring 44 will once again open valve 42 and allow the flow to increase. In this manner, stable equilibrium is developed in which the thermally responsive valve maintains the gas flowing from module 22 at a relatively stable temperature. It has been determined that a system according to the present invention operates well with the wax within cylinder 52 is selected such that valve 42 begins closing when the coolant reaches approximately 90° F., with the flow being substantially reduced at the time 100° F. coolant is reached. Those skilled in the art will appreciate in view of this disclosure that the wax type of thermally responsive device shown in the present invention has been used for years in automobiles in such devices as ported vacuum switches and engine thermostats. Such wax-filled cylindrical temperature responsive plungers have been calibrated at many different temperatures and may be selected by a user of the present invention according to the needs of the engine to which the present invention is being applied.

Because the present temperature control means is mounted in heating chamber 40 in close proximity to the pressure regulator, and in proximity to the coolant exit from the heating chamber, thermally responsive valve 42 actually senses the bulk, or average, temperature of the coolant leaving heating chamber 40. As a result, it is possible to obtain very fine regulation of the gas discharge temperature, while at the same time avoiding clogging of the pressure regulator with ice, thus providing a major advantage over known prior art systems.

While the invention has been shown and described in its preferred embodiments, it will be clear to those skilled in the arts to which it pertains that many changes and modifications may be made thereto without departing from the scope of the invention. For example, in addition to the illustrated configuration, heating chamber 40 could comprise a passage having a spiral, or coiled configuration, with the passage underlying pressure regulator 28.

I claim:

1. A fuel supply module for furnishing gaseous fuel to a liquid cooled automotive internal combustion engine, comprising:

a pressure regulator for reducing gas pressure from a relatively higher tank pressure to a relatively lower pressure required for induction into an engine;

a heating chamber integral with said pressure regulator and which surrounds at least part of a valve means incorporated in said pressure regulator;

means for conducting liquid engine coolant from an engine into said heating chamber and for returning said coolant to the engine such that heat will be transferred from the coolant to the gas flowing through the fuel supply module; and temperature control means located within said heating chamber for sensing the temperature of the coolant within the chamber and for controlling the amount of coolant flowing through said heating chamber in response to said sensed temperature, so as to control the amount of heat which is transferred to the gas flowing through the fuel supply module.

2. A fuel supply module according to claim 1, wherein said temperature control means comprises a thermally responsive valve mounted within said heating chamber such that as the temperature of the engine coolant flowing into the heating chamber increases, the valve will begin to close, and thereby restrict the flow of coolant through the heating chamber, as a first predetermined temperature has been reached, with the valve closing substantially as a second predetermined temperature is reached, such that the temperature within the heating chamber will be maintained at the second predetermined temperature.

3. A fuel supply module according to claim 2, wherein said valve comprises a sealed, generally cylindrical chamber having a pushrod extending axially therefrom, with the cylinder containing a thermally responsive material having a positive coefficient of thermal expansion, such that said pushrod will be moved axially from the cylinder when the coolant temperature within the heating chamber increases, with the result that the pushrod will contact an abutment, thereby urging the cylinder into contact with a valve seat associated with a passage for conducting coolant through the heating chamber, so as to restrict the flow of coolant through the heating chamber.

4. A fuel supply module according to claim 1, wherein said temperature control means senses the bulk temperature of engine coolant flowing from said heating chamber to said engine.

5. A fuel supply module for furnishing compressed natural gas to a liquid cooled internal combustion engine, comprising:

a pressure regulator for reducing gas pressure from a relatively higher tank pressure to a relatively lower pressure required for injection into an engine;

a heating chamber which is integral with said pressure regulator and which surrounds at least part of a poppet valve incorporated in said pressure regulator;

a supply conduit for conducting liquid engine coolant from an engine into said heating chamber and a return conduit for returning said coolant to the engine such that heat will be transferred from the coolant to the gas flowing through the fuel supply module; and a temperature controller, mounted within the heating chamber, for sensing the temperature of the coolant within the chamber and for controlling the amount of coolant flowing through said heating chamber in response to said sensed temperature, so as to control the amount of heat which is transferred to the gas flowing through the fuel supply module.

6. A fuel supply module according to claim 5, wherein said temperature controller comprises a thermally responsive valve mounted within said heating chamber such that as the temperature of the engine coolant flowing into the heating chamber increases, the valve will begin to close, and thereby restrict the flow of coolant through the heating chamber, as a first predetermined temperature has been reached, with the valve closing substantially as a second predetermined temperature is reached.

7. A fuel supply module according to claim 6, wherein said supply conduit comprises an inlet for admitting engine coolant into the heating chamber, and said return conduit comprises an outlet for allowing engine coolant to leave the heating chamber, with said thermally responsive valve comprising a thermally responsive plunger mounted in proximity to a valve seat circumscribing said outlet, such that as the temperature of the engine coolant flowing into the heating chamber increases above a threshold value, the plunger will begin to move into closer proximity to said valve seat, thereby causing the valve to begin closing, with the valve maintaining the temperature within the heating chamber at a predetermined level.

8. A fuel supply system for furnishing compressed natural gas to a liquid cooled internal combustion engine, comprising:

a pressure regulator for reducing gas pressure from a relatively higher tank pressure to a relatively lower pressure required for injection into an engine;

a heating chamber surrounding at least part of a valve means incorporated in said pressure regulator;

a supply conduit for conducting liquid engine coolant from an engine into said heating chamber and a return conduit for returning said coolant to the engine such that heat will be transferred from the coolant to the gas flowing through the fuel supply module;

a temperature controller for sensing the temperature of the coolant within the chamber and for controlling the amount of coolant flowing through said heating chamber in response to said sensed temperature, so as to control the amount of heat which is transferred to the gas flowing through the regulator;

a tank for storing compressed gas and a pipe for conducting gas from the tank to the pressure regulator; and at least one injector connected to the regulator to receive lower pressure gas therefrom and to inject the gas into the engine.

\* \* \* \* \*

UNITED STATES PATENT AND TRADEMARK OFFICE
CERTIFICATE OF CORRECTION

PATENT NO. : 5,483,943
DATED : Jan. 16, 1996
INVENTOR(S) : Edward W. Peters, Belleville, Mich.

It is certified that error appears in the above-identified patent and that said Letters Patent is hereby corrected as shown below:

On the title page, item [75], should read:

Inventors(s): Edward W. Peters, Belleville, Mich.
              Jeffrey B. Gotthelf, Summerville, S. Carolina
              Charles W. Otap, St. George, S. Carolina Signed and Sealed this Twenty-fifth Day of November, 1997

*Attest:*

BRUCE LEHMAN

*Attesting Officer*      *Commissioner of Patents and Trademarks*